Inventor
Robert S. A. Dougherty
and John E. Eberhardt.
By R. S. A. Dougherty.
Attorney March 12, 1946.   R. S. A. DOUGHERTY ET AL   2,396,461
OPEN HEARTH FURNACE OPERATION
Filed Feb. 25, 1944   3 Sheets-Sheet 2

Inventor
Robert S. A. Dougherty
and John E. Eberhardt.
By R. S. A. Dougherty
Attorney March 12, 1946.  R. S. A. DOUGHERTY ET AL  2,396,461
OPEN HEARTH FURNACE OPERATION
Filed Feb. 25, 1944  3 Sheets-Sheet 3
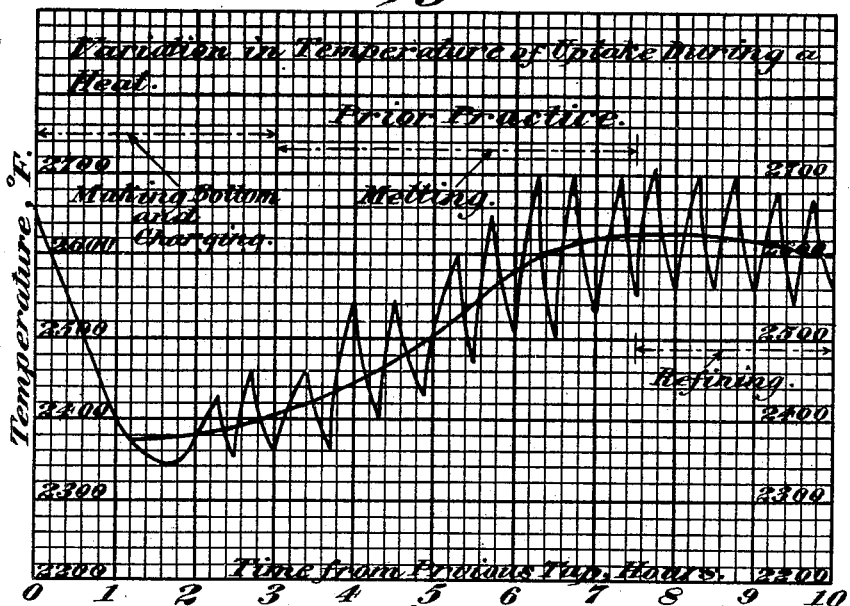
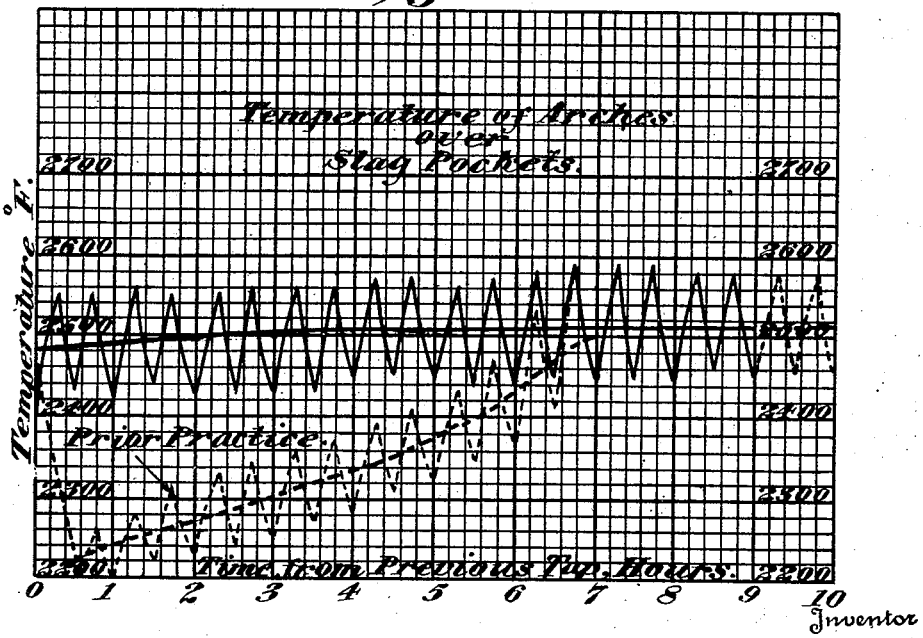
Inventor
Robert S. A. Dougherty
and John E. Eberhardt.
By R. S. A. Dougherty.
Attorney Patented Mar. 12, 1946

2,396,461

UNITED STATES PATENT OFFICE 2,396,461

OPEN-HEARTH FURNACE OPERATION

Robert S. A. Dougherty and John E. Eberhardt, Bethlehem, Pa., assignors to Bethlehem Steel Company, a corporation of Pennsylvania Application February 25, 1944, Serial No. 523,862

2 Claims. (Cl. 263—52)

This invention relates in general to a method of increasing the production of an open-hearth furnace, and more particularly to a method of reducing heat time by the direct firing of the heaters which furnish preheated air to the furnace.

In the manufacture of steel, for example, by the basic open-hearth process, a cold charge of limestone, ore, and scrap is heated in the furnace until the scrap has started to melt. A charge of molten pig iron is then added and the melting continues until the charge is completely molten whereupon the limestone rises and floats on the surface of the molten metal forming the refining slag. Jets of burning gas, oil, or other fuel projected alternately from one and then the other end of the furnace impart heat to the charge and to the resulting bath. The hot waste gases pass from the temporarily non-firing end into air preheaters which absorb some of their heat, and thence pass out through a stack. After a brief interval, usually fifteen or twenty minutes, the fuel and air are shut off at the one end, and the gas and air, or air alone, introduced through the air preheater at the opposite end. A series of such reversals is continued until purification is completed.

At the end of the heat however, after the refined metal has been tapped, it is necessary to renew the bottom and recharge the furnace. The doors must stand open for a rather considerable period, admitting cold air to the furnace and thence to the air preheaters by suction. The cold air so drawn in may cause the temperature of the air preheaters to drop as much as 300° F., and as much as six hours of furnace firing may be required to regain the lost temperature.

One object of this invention is a method of raising production and decreasing heat time by burning fuel in the air preheaters during periods of normally lowered temperatures.

A further object is a method of supplying uniformly preheated air to an open-hearth furnace.

Other objects and purposes of this invention will appear hereinafter in the specification and in the appended claims.

Referring to the drawings:

Fig. 4 is a chart showing typical uptake wall temperatures during the course of a heat under the prior practice; and Fig. 5 is a chart showing the comparative temperatures of the arches over the slag pockets under the prior and the new practice.

Figure 1:
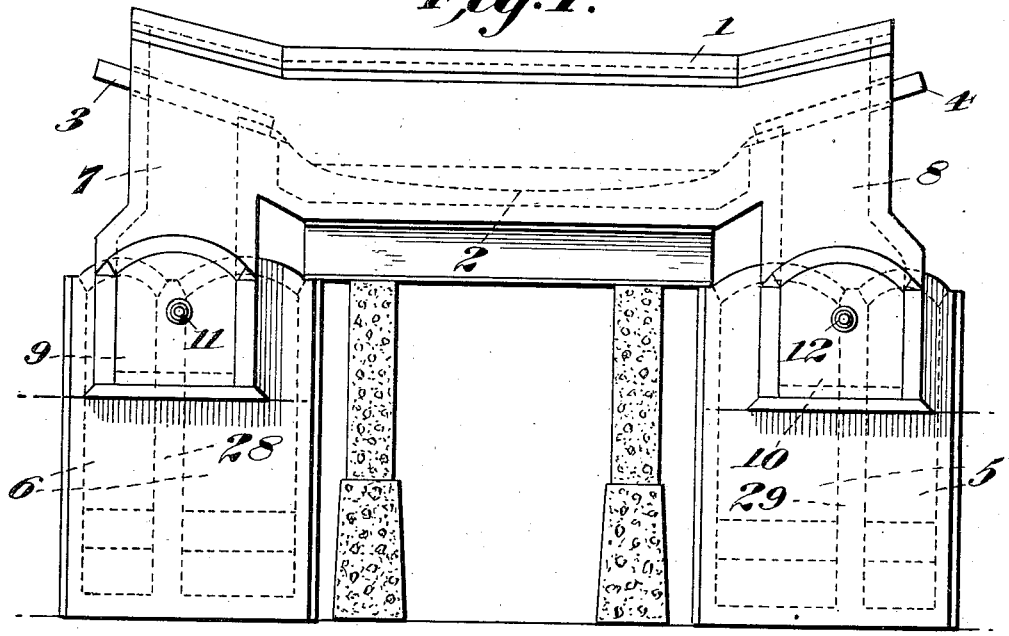
Figure 1 is a front elevation of the tapping side of an open-hearth furnace illustrating an application of the invention.
Figure 2:
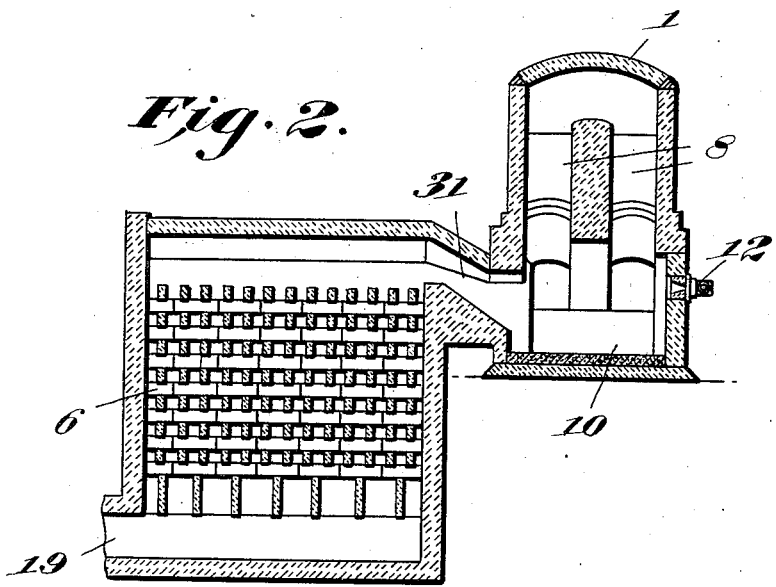
Fig. 2 is a vertical section taken along the lines 2—2 of Fig. 3.

Open-hearth furnace 1, has a hearth 2 and fuel burners 3 and 4. At each end of the hearth are the conventional air preheaters 5 and 6, connecting at their inner ends with the furnace 1 through the vertical flues or uptakes 7 and 8 and slag pockets 9 and 10 respectively. The said slag pockets 9 and 10 are provided with the burners 11 and 12. The combustion air lines 13 and 14, equipped with valves 15 and 16, connect to the motor-driven blower 17. At their outer ends air preheaters 5 and 6 connect through the large flues 18 and 19 to the central flue 20 and thence to the stack 21. The central flue 20 and stack 21 may be closed off as desired by the dampers 22 and 23, and the air inlets 24 and 25, provided with dampers 26 and 27, connect to the flues 18 and 19.

The air preheaters 5 and 6 are divided into separate chambers by the partition walls 28 and 29, and are provided with short fanlike entrance flues or fantails 30 and 31, as in the usual construction.

Figure 3:
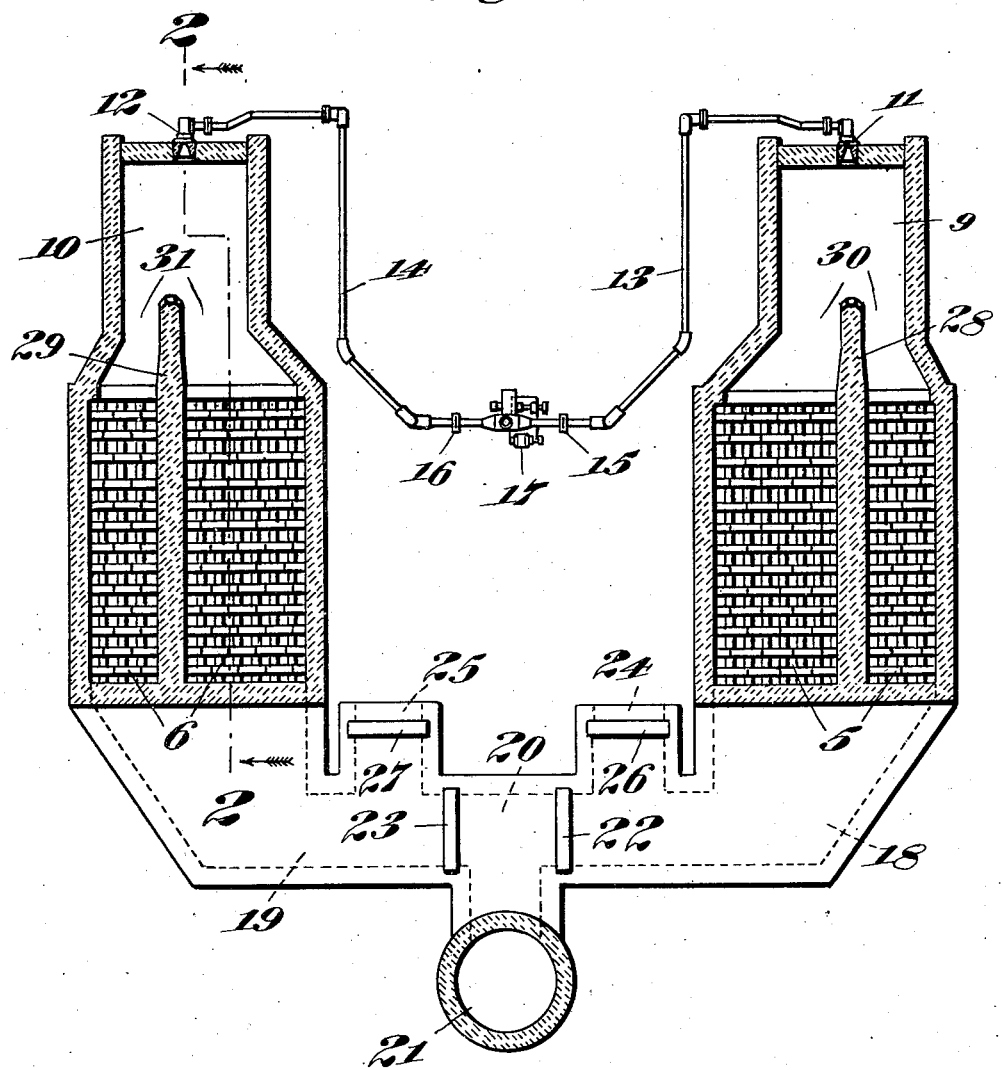
Fig. 3 is a plan view partly in section of the air preheating system of an open hearth furnace.

The method of operation is as follows: Referring to Fig. 3 of the drawings, and assuming that the furnace is in the last or refining stage of a heat, with the burners 11 and 12 shut off, the right-hand air preheater 5 having just been heated and the left-hand air preheater 6 being about to be heated, the cold air from outside enters the air inlet 24 and flows through the open damper 26 and flue 18 to said right-hand preheater 5 where the air is preheated. Thence it passes through the fantails 30, slag pocket 9 and uptake 7 and burns the fuel from burner 3 over the hearth 2. The waste gases of combustion pass through the vertical flue 8 and fantails 31 into the left-hand preheater 6, and finally through the flue 19 and open damper 23 to the stack 21. As an alternative where it is desired to utilize the residual heat of the waste gases, the outflow may go to a conventional waste heat boiler, auxiliary air preheaters, or the like instead of direct to stack.

The flow of the preheated air, which has been described as from right to left of Fig. 3, is reversed to flow from left to right at predetermined intervals as in the usual practice.

So far the method of operation is conventional. The principal difficulty comes at the end of one heat and the beginning of another, when the hot metal on the hearth has been tapped, and the doors of the furnace must be opened to permit renewing the bottom and charging the furnace. The air thus admitted and the materials of the charge are bound to be cold, and their effect is to cause a sudden drop in the temperature of the air preheaters, which prolongs the melting period, and postpones and lengthens the refining period.

Fig. 4 of the drawings shows the variation in the temperature of an uptake during the progress of a heat as observed for the prior practice. It will be seen that during the greater portion of the heat this temperature exhibits rather regular variations over about half-hour intervals. These correspond to the reversals of the furnace; during a 15 minute interval the temperature falls, indicating that air is being heated in the air preheater on that end of the furnace and during the succeeding 15 minute interval the temperature rises, indicating that the air preheater on that end of the furnace is being heated by the waste gases from the furnace. In the present case the variation caused by furnace reversals is of little interest; of far greater significance is the variation in a temperature determined by taking the average of a peak and its successive valley and vice versa. This temperature will hereinafter be called the median temperature; it is shown in Fig. 4 as a heavy line passing midway between the peaks and valleys of the curve showing the uptake temperature.

In Fig. 4 during the hour and a half following the tapping of the preceding heat the median temperature has fallen about 300° F. Furthermore during the balance of the bottom-making and charging period the temperature rises very slowly. After the furnace has been charged and during the melting period it will be seen that the median temperature rises until it reaches its maximum value shortly before the end of the melting period and thereafter remains nearly constant throughout the refining period or until the heat is tapped. It will be obvious from Fig. 4 that the median temperature was less than its maximum value for a period of about six hours during the making of the heat.

Our invention is directed toward increasing the rate of heat transfer to the charge during this period of low median temperature and thereby increasing the production rate of the furnace. This is accomplished by burning fuel in the air preheaters during the bottom-making and charging stages of the heat to maintain a substantially uniform median temperature during the charging, melting, and refining stages of the heat. The resulting higher temperature of the preheated air during the period when this temperature is normally low, as shown in Fig. 4, results in higher flame temperature in the furnace and therefore in a higher rate of heat transfer to the charge and an increased production rate.

Referring again to Fig. 3, we burn fuel in the air preheaters during the bottom-making and charging stages by means of the burners 11 and 12, which are provided with reversing mechanisms (not shown) so that the proper burner fires into the slag pocket on the outgoing end of the furnace. The blower 17 supplies air to the burners 11 and 12 through the pipe lines 13 and 14 in sequence, the direction of flow being controlled by the valves 15 and 16.

Said burners 11 and 12 are turned on immediately after tap, and the firing is so regulated during the bottom-making and charging periods that the median temperature of the arches over the slag pockets or of some other convenient reference point, as indicated by pyrometers, remains substantially constant and equal to that indicated before tapping. Temperature records as obtained by a recording radiation pyrometer sighted on the arch over the slag pocket of an open-hearth furnace are shown in Fig. 5. The lower dashed line indicates temperatures recorded during the making of a heat by the prior practice. It will be seen that the median temperature, indicated by the heavy dashed line, shows the same sudden drop and gradual rise exhibited in Fig. 4 although the recorded temperatures at corresponding stages of the heat are lower because of the different point at which the temperatures were measured. The upper solid line indicates temperatures recorded during the making of a heat by the new practice. It will be noted that the median temperature, as indicated by the heavy solid line, does not drop but rather remains substantially constant throughout the heat. The resulting saving in heat time of about an hour is indicated in Fig. 5 by the termination of the solid line about an hour before the termination of the dashed line.

While we have thus shown and described our invention in a particular application and embodiment, we wish it understood that other and equivalent applications and embodiments are possible and may be used without departing from the spirit and essence of our invention.

Having thus described our invention, what we claim as new and useful and desire to protect by Letters Patent is:

1. In an open-hearth furnace operation, the steps of heating the air preheaters by the waste gases of the furnace, and burning fuel in the air preheaters during the bottom-making and charging stages to maintain a substantially constant median temperature of the air preheaters during the charging, melting and refining stages.

2. In an open-hearth furnace operation, the step of burning fuel in the air preheaters during the bottom-making and charging stages in sufficient amount to maintain the temperature of the air preheaters during the charging and melting stages at substantially as high a temperature as that during the refining stage.

ROBERT S. A. DOUGHERTY.
JOHN E. EBERHARDT.